Dec. 24, 1929. W. J. TERRY 1,740,796
DENTAL HANDPIECE
Filed Dec. 13, 1926
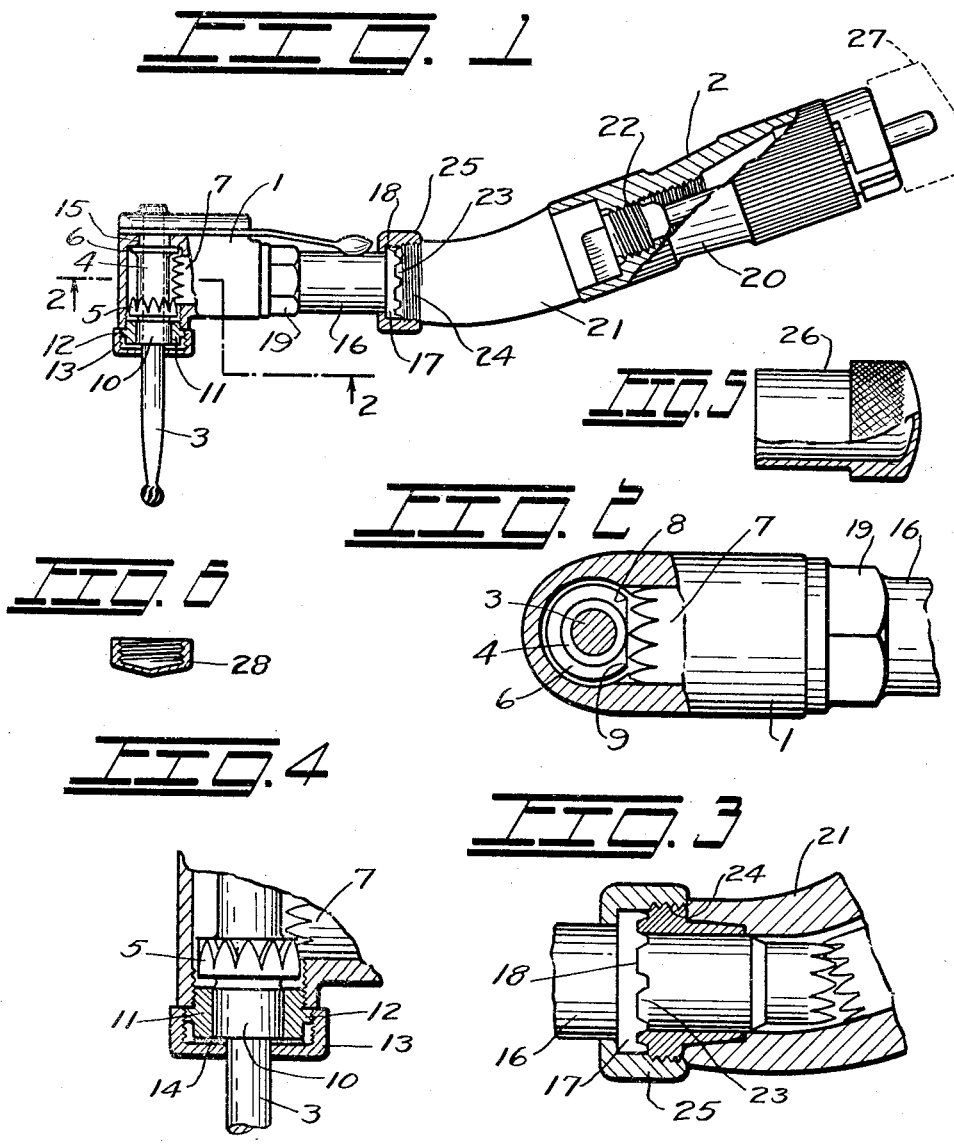
Inventor
Walter J. Terry
By Harry Bowen
Attorney Patented Dec. 24, 1929

1,740,796

UNITED STATES PATENT OFFICE

WALTER J. TERRY, OF SEATTLE, WASHINGTON

DENTAL HAND PIECE

Application filed December 13, 1926. Serial No. 154,355.

The invention is an improvement in dental handpieces of the angular type providing simple and efficient means for adjusting the angle of the head in relation to the handle, a removable packing gland at the base of the head, means for removing the drive spindle in the head without dismantling the remainder of the head, and means for completely sealing the instrument while sterilizing.

The object of the invention is to provide an angular handpiece in which the angle of the head may be readily adjusted, saliva prevented from entering the head and the head spindle readily removed.

Another object of the invention is to provide means for rigidly holding the head to the handle which will permit the angle of the head to be readily adjusted.

Another object of the invention is to provide means for increasing wear and service of the instrument by preventing saliva and emery dust and cleaning compounds, and all foreign substances, from entering the head and bearings.

A further object of the invention is to provide means for completely sealing the instrument while the exterior is sterilized by boiling or dipping in liquids so that the lubricant will not have to be removed.

And a still further object of the invention is to provide means on the vertical spindle in the head to permit its being readily withdrawn.

With these ends in view the invention embodies, an angular head, a handle with teeth at the end to correspond with grooves in the end of the head, a nut for holding the head to the handle, a cap at the lower end of the head for holding a packing gland, a vertical spindle in the head with a flange at the upper end having a portion removed, a plug for closing the open end of the handle, and a solid cap for closing the base of the head.

Other features and advantages of the invention will appear from the following description taken in connection with the drawings, wherein:

Figure 1 is a side view of the handpiece with parts broken away.

Figure 2 is a sectional view on line 2—2 of Figure 1.

Figure 3 is a sectional view showing the joint between the head and the handle.

Figure 4 is a vertical section through the lower end of the head showing the cap for holding the packing gland.

Figure 5 is a view showing the removable plug for closing the open end of the handle.

Figure 6 is a view showing an extra solid cap for closing the base of the head.

In the drawings the device is shown as it would be made, wherein numeral 1 indicates the head, numeral 2 the handle and numeral 3 a burr that may readily be held in the head.

The head may be made as shown with a vertical spindle 4 having a gear 5 rigidly attached to one end and a flange 6 at the other. It will be observed that the gear 5 meshes with a gear 7 that is mounted on a shaft that extends through the handle into the head. It will be observed that as the shaft rotates the gears will rotate the spindle 4 and the spindle will rotate the burr 3 that may be held therein. A portion of the flange 6 is cut away from the point 8 to the point 9 as shown in Figure 2 so that when the spindle is rotated to the position shown in Figure 2 the flange will pass by the gear 7 and permit the spindle to be withdrawn.

The spindle is provided with a bearing 10 at the lower end which is held in a nut 11 and it will be observed that the nut 11 is screwed into the lower end of the head so that it may readily be removed. The nut 11 is also provided with a threaded flange 12 upon which a cap 13 is screwed and it will be observed that a packing gland 14 may be held between the cap 13 and the nut 11, as shown in Figure 4. At the upper end of the spindle 4 is another bearing 15 which holds the upper end of the spindle in the head as shown.

Between the head and handle is a sleeve 16 that is threaded into the head at one end and provided with a flange 17 having grooves 18 at the other, as shown in Figure 3. The outer surface of this sleeve is also provided with a nut 19 so that it may readily be gripped by a wrench to unscrew it from the head.

The handle 2 may be made as shown with a sleeve 20 attached to an angular member 21 by the threads 22, and it will be observed that the member 20 is made from a solid piece of material. The member 21 is provided with a sleeve having teeth 23 and threads 24 at one end, as shown, and it will be observed that the teeth will correspond with the grooves 18 so that they may be held into the flange 17 of the member 16 by a nut 25 which may be screwed on the threads 24 of the member 21. The nut 25 may be unscrewed until the teeth 23 leave the grooves 18 and then the position of the head may be rotated as desired and then the nut screwed back to rigidly hold the head to the handle. It is understood that this nut may be of any suitable shape or size and the teeth or grooves may be larger or smaller or of any suitable shape. This connection with the sleeve having the teeth 23 and the sleeve 16 may be used in many of the present American type of angular handpieces.

A plug 26 is shown in Figure 5 which may be inserted in the open end of the handle 2, as indicated by the dotted lines 27, and a solid cap 28 is shown in Figure 6 which is similar to the cap 13, except for the opening in the center, and it will be observed that with the burr 3 removed and the cap 13 replaced by the cap 28, and the plug 26 inserted in the handle, the instrument will be completely sealed and be sterilized by boiling without affecting the oil or grease in the interior.

It is understood that changes may be made in the construction without departing from the spirit of the invention, one of which changes may be in the use of this packing gland cap or a spindle of this design in a head of any other type or design, another may be in the use of other means for attaching the cap to the head and still another may be in the design of the spindle.

Having thus fully described the invention, what I claim as new and desire to secure by Letters Patent, is:

1. In a dental handpiece of the class described, a head, a handle, adjustable means for holding the head to the handle permitting the angle of the head to be changed in relation to the handle, a vertical spindle in the said head, a flange at the end of the said spindle, said flange having a portion omitted to permit it to pass by an object in the said head, and a readily removable cap at the tip of the said head for holding a packing gland or the like.

2. In an angular handpiece of the class described, a head, a handle, a spindle in the said head, a nut for holding the said spindle in place, a packing gland at the end of the said nut, and another nut adaptable to screw on the exterior of the said former nut to hold the said packing gland and thereby seal the end of the said device around the burr.

3. In an angular handpiece of the class described, a head, a handle, a spindle in the said head, means for rotating the said spindle the said spindle having a flat side whereby it may pass by a part of the said rotating means.

4. In an angular handpiece of the class described, a head, a handle, and a spindle in the said head, said spindle having a flange around the upper end and a portion of the said flange being removed to permit the said spindle to be readily withdrawn from the head.

5. A spindle for holding the tool in dental handpieces having a partial flange for permitting it to be readily removed.

In testimony whereof I affix my signature.

WALTER J. TERRY.